C. RINGWALD
Aug. 25, 1931. DRIVE FOR ENGINE STARTERS Re. 18,164
Original Filed Oct. 24, 1924
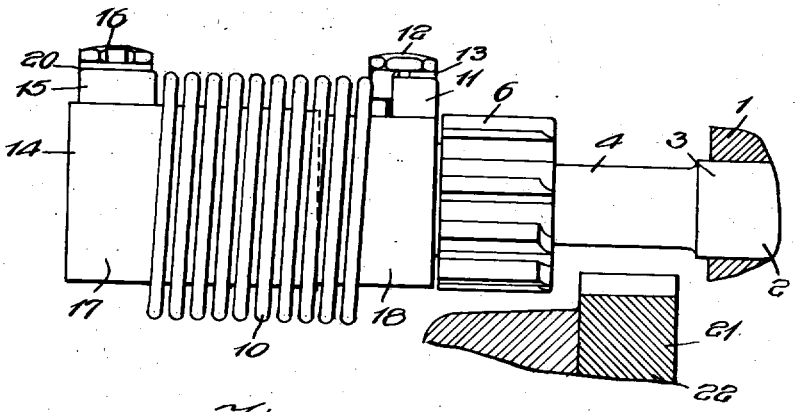
Fig. 2.
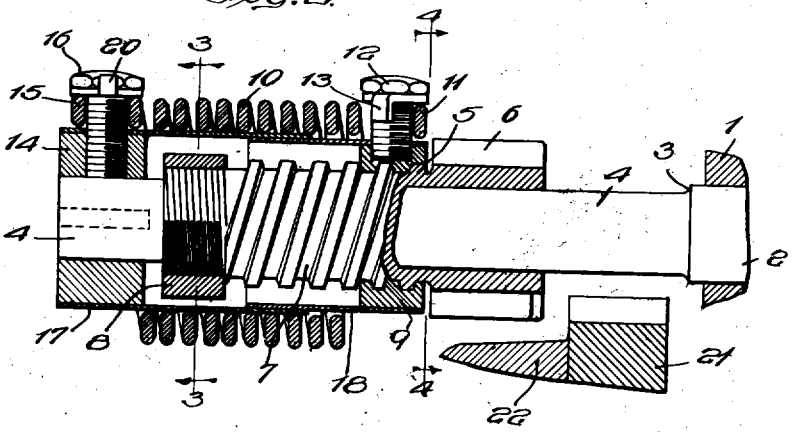
Fig. 3.
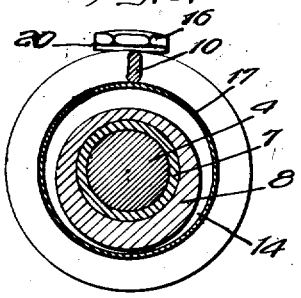
Fig. 4.
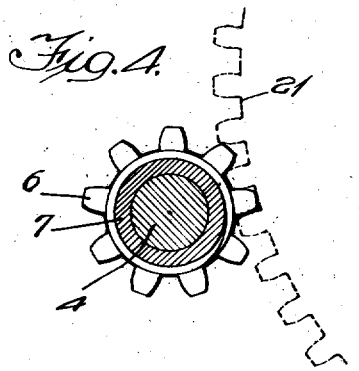
Witnesses:
W. P. Kilroy
Harry T. L. White
Inventor:
Clarence Ringwald
By Brown Boettcher & Dienner
Attys.

Reissued Aug. 25, 1931 Re. 18,164

UNITED STATES PATENT OFFICE

CLARENCE RINGWALD, OF NORTH HAMPTON, OHIO, ASSIGNOR, BY DIRECT AND MESNE ASSIGNMENTS, TO ECLIPSE MACHINE COMPANY, OF ELMIRA HEIGHTS, NEW YORK, A CORPORATION OF NEW YORK

DRIVE FOR ENGINE STARTERS

Original No. 1,597,330, dated August 24, 1926, Serial No. 745,555, filed October 24, 1924. Application for reissue filed August 23, 1928. Serial No. 301,667.

My invention relates to drives for engine starters. I am aware that heretofore it has been the practice in starting internal combustion engines to employ a threaded sleeve mounted upon the motor shaft and connected to said motor shaft by a spring connection. An internally threaded drive pinion forms a nut for said threaded sleeve and it is moved axially into mesh with the ring gear on the fly wheel of the engine by rotation of the motor shaft and its threaded sleeve, and after the nut or pinion is meshed with said ring gear, it is rotated to turn the fly wheel and thus crank the engine.

In such devices, the parts must fit loosely and move easily, because the pinion nut is held by inertia while it moves axially into mesh with the ring gear. Since the sleeve is interposed between the pinion and the shaft, there is excessive play and lost motion with consequent friction in the gear teeth and inaccuracy in fit of the parts. The interposition of the sleeve also demands a pinion of larger diameter with consequently less leverage.

According to my invention, I make the parts fewer in number by having the pinion provided with an axially extending sleeve which sleeve and pinion are unitary and fit upon the motor shaft. An external nut connected through a spring connection with the motor shaft then serves to thread the pinion and its sleeve into mesh with the ring gear on the fly wheel and thus secure meshing between the driving pinion and the ring gear.

By the employment of my invention, it is possible to use a pinion of smaller diameter with a consequent increase in starter ratio. The use of my invention gives greater inertia to the pinion without the addition of extra material for that purpose. The pinion, furthermore, is now mounted upon the ground motor shaft with a fine fit, thereby securing accurate centering and better support, not only from the motor shaft, but also from the bearings of the motor. Also there is less pounding and tilting of the pinion.

Furthermore, the construction permits the pinion to be driven closer to the bearing of the starter motor, so that longer life and better wearing qualities are assured. Above all, the construction is cheaper than any heretofore proposed with which I am familiar.

In order to acquaint those skilled in the art with the manner of constructing and operating my invention, I shall now describe a specific embodiment of the same in connection with the accompanying drawings, in which:

Figure 1 is a side elevational view of a device embodying my invention;

Fig. 2 is a vertical longitudinal sectional view through the same;

Fig. 3 is a transverse section taken on the line 3—3 of Fig. 2; and

Fig. 4 is a similar transverse section taken on the line 4—4 of Fig. 2.

The bearing 1 of the driving motor supports the motor shaft 2, this motor shaft having a shoulder 3 and a reduced portion 4 extending therefrom, this reduced portion being carefully ground to fit the interior of the pinion and sleeve member 5 which fits upon said shaft 4. The pinion and sleeve member 5 is a unitary member comprising a pinion 6 and a threaded portion 7 extending to the rear of the same. Upon the rear end of the threaded sleeve 7 I provide an unbalanced stop nut 8 which is securely fastened upon the rear end of the threaded part 7 to provide a stop in conjunction with the driving nut 9 when the two parts are engaged. This stop nut 8 is ecccentric and is preferably threaded upon the end of the threaded sleeve 7 by screw threads of fine pitch inclined in a direction such as to produce tightening of the nut 8 thereupon when it engages the nut 9. The threaded sleeve 7 has screw threads of coarse pitch and preferably of multiple thread.

The nut 9 is connected to the end of a suitable spring 10, the end of the spring being formed into a loop or eye at 11 and the machine screw 12 passing radially through said eye 11 and into the nut 9 and being held against rotation by a suitable bendable lock washer 13.

At the outer end of the motor shaft 4, I provide a collar 14, to which the outer end of the spring 10 is connected in a similar manner to its connection through the nut 9. The outer end of the spring 10 has an eye 15 through which passes a bolt 16, this bolt being passed into the body of the collar 14 and engaging the end of the shaft 4. The shaft 4 is keyed to said collar 14 in addition to the engagement of the bolt 16 for rigidly connecting said collar 14 and the end of the shaft 4.

A pair of sheet metal sleeve members 17 and 18 are passed under the ends of the spring 10 on the collar 14 and the nut 9, respectively, these sheet metal sleeves serving to exclude foreign matter from the threads of the sleeve 7, and serving also as a support for the convolutions of the helical spring 10, and as a container for lubricant.

The pinion 6 and shaft 4 are mounted closely adjacent the ring gear 21 on the fly wheel 22 of the motor, the parts being so designed as to permit the pinion 6 to run axially up to the shoulder 3 or closely adjacent thereto, when the stop nut 8 engages the end of the driving nut 9.

The operation of the device is as follows:

The shaft 4 being set closely adjacent the ring gear 21 and in proper endwise adjustment, rotation of the motor shaft 2 in a counter clockwise direction as viewed from the right of Figs. 1 and 2 results in a movement of the connected parts, namely, the collar 14, bolt 16, spring 10, bolt 12, and driving nut 9. The inertia of the pinion and sleeve member 5, together with the eccentric nut 8, tends to hold these parts against rotation while the nut 9 is rotated to advance the pinion 6 axially, until it strikes the teeth of the ring gear 21 and meshes with the same, whereupon engagement of the stop collar 8 with the end of the driving nut 9, results in rotation of the pinion 6 and consequent driving of the ring gear 21 to crank the engine. Upon starting of the engine in the same direction at a speed greater than the speed of the nut, the member 5 comprising the pinion 6 and the threaded sleeve 7, will be carried back axially to the left, as indicated in Figs. 1 and 2. It will be obvious that, if desired, a collar may be provided at the left end of the pinion 6 as shown in Figs. 1 and 2, or that if desired the pinion 6 may be run up against the shoulder 3 on the shaft 2. On the return motion the pinion stops by engaging the outer face of collar 9.

From the foregoing, it will be seen that I have provided a construction which permits of a pinion of a minimum number of teeth and of a minimum diameter, in order to secure a maximum starting ratio. At the same, time, the rearwardly extending threaded sleeve 7 gives the pinion 6 greater inertia without increasing the diameter of the same and thus makes for certainty of operation. The pinion 6 is held accurately and with much greater bearing on the ground shaft section 4 than has been possible in devices of the prior art. It will be noted that the pinion can now be brought up to the motor bearings, since no collar is required at the inner end of the pinion as in devices of the prior art, and better support is thereby gained. In addition to the above advantages, the construction is less expensive and involves a less number of parts.

I claim:

1. In combination, a sleeve member bearing a coarse external thread and having a pinion on one end, a threaded collar on said threaded part of the sleeve member, an attaching collar, a helical drive spring concentric with said sleeve between said two collars and a stop on the threaded end of the sleeve for engaging the threaded collar to stop the forward movement of the member.

2. In combination, a driving shaft, an externally threaded sleeve on said shaft having an integral pinion at one end, an internally threaded collar embracing the threads on said sleeve, a stop collar on the end of the sleeve opposite said pinion, a collar nonrotatably secured to said driving shaft, and a helical spring connecting said last named collar and said internally threaded collar and extending over the end of said sleeve and its attached stop collar.

3. In combination, a rotatable motor shaft, a one-piece sleeve and pinion member mounted directly on said shaft, a threaded nut embracing the sleeve, a collar on the end of the motor shaft and a coil spring between said collar and said nut and telescoping over said sleeve.

4. In combination, a motor shaft, a unitary sleeve and pinion member mounted thereon, said sleeve having a threaded portion terminating in a shoulder, a nut threaded on said sleeve, an attaching collar mounted on and secured to said motor shaft, a helical drive spring connecting said nut and collar, and means for supporting the convolutions of said spring.

5. In combination, a motor shaft adapted to be closely positioned adjacent a ring gear for an internal combustion engine, a threaded sleeve and pinion member mounted directly on said shaft, said pinion forming a shoulder at one end of the threaded sleeve and a stop collar mounted at the other end of the threaded sleeve and forming a shoulder, a threaded nut between said shoulders on said threaded sleeve, a collar secured on the outer end of the motor shaft and a coil spring connecting said collar with said threaded nut and embracing the sleeve.

6. In combination, a sleeve member bearing a coarse external thread and having a pinion on one end, a threaded collar on said threaded part of the sleeve member, an attaching collar, a yielding member concentric with said sleeve between and secured to said two collars, the collar on the sleeve being otherwise free from the attaching collar, and a stop on the threaded end of the sleeve for engaging the threaded collar to stop the forward movement of the member, said yieldable member being yieldable axially.

7. In combination, a driving shaft, an externally threaded sleeve on said shaft having an integral pinion at one end, an internally threaded collar embracing the threads on said sleeve, a stop collar on the end of the sleeve of the said pinion, a collar non-rotatably secured to said driving shaft, and a flexible member between and secured to said collar on the shaft and said internally threaded collar, said member transmitting the entire drive between said nonrotatable collar and said threaded collar.

8. In combination, a rotatable motor shaft, a one-piece sleeve and pinion member mounted directly on said shaft and comprising a threaded integral sleeve, a nut on the sleeve, a collar on the end of the motor shaft, and a member yieldable angularly and axially of the shaft between and secured to said collar and said nut.

9. In combination, a driving shaft, a one-piece sleeve and pinion member mounted on the driving shaft, a threaded nut on said sleeve, said sleeve having a threaded portion with a shoulder at the rear end of the threaded portion, an attaching collar mounted on and secured to the shaft, and a flexible coupling member between and secured to the collar and the nut and telescoping with said sleeve.

10. In combination with a driving shaft having a bearing, a sleeve and pinion member mounted on said shaft with the pinion end towards the bearing, said sleeve having a threaded portion, a threaded nut on the sleeve, an attaching collar on the outer end of the shaft, and a member flexible angularly and axially of the shaft for connecting said nut and collar and transmitting the entire drive between them.

11. In combination a rotatable motor shaft, a sleeve and pinion member, a collar threaded on the sleeve, a collar fixed on the motor shaft, and a member yieldable axially of the shaft connected between said two collars, said member transmitting the entire drive of the shaft to the pinion.

12. In combination, a drive shaft, a sleeve loose on the shaft for relative sliding and rotary movements, a pinion rigid with the sleeve and movable therewith, a member having threaded connection with the sleeve for moving the latter lengthwise of the shaft, a second member carried by the sleeve and cooperating with the first member for clutching the two members together when the sleeve has been moved in one direction into full operative position, and a yielding driving connection between said first member and the shaft, said connection yielding axially of the shaft.

13. In combination, a drive shaft, a sleeve on the shaft, a pinion rigid with the sleeve, a member having threaded connection with the shaft for shifting the latter lengthwise on the shaft, means comprising a coil spring connecting the shaft and said member and establishing a driving connection therebetween, said spring yielding axially of the shaft and the sleeve being otherwise free for sliding movement in both directions on the shaft, said shaft and the sleeve having relative rotary movement, and means cooperating with the shifting member for establishing driving connections between the same and the sleeve when the latter has been shifted into full operative position.

14. In combination, a drive shaft, a sleeve loose on the shaft for relative sliding and rotary movements, a pinion rigid with the sleeve and movable therewith, a rotatable collar concentric with the sleeve and having threaded connection therewith, a collar secured to the shaft, a coil spring disposed about the shaft and between the collars, the ends of the spring being secured to said collars and the sleeve being otherwise free for sliding movement in both directions upon the shaft, and a collar secured to the sleeve and disposed for contact with said rotatable collar for establishing driving connections between the same and the sleeve when said sleeve has been shifted into its full operative position.

In witness whereof, I hereunto subscribe my name this 21st day of August, 1928.

CLARENCE RINGWALD.